United States Patent [19]

Del Rio

[11] 3,746,231

[45] July 17, 1973

[54] AUTOMATIC WEAR COMPENSATING MECHANISM

[75] Inventor: Eddy Humberto Del Rio, Palm Beach Gardens, Fla.

[73] Assignee: RCA Corporation, New York, N.Y.

[22] Filed: Apr. 20, 1972

[21] Appl. No.: 245,860

[52] U.S. Cl. .................................. 226/177, 226/194
[51] Int. Cl. ............................................ B65h 17/22
[58] Field of Search .................... 226/176, 177, 194, 226/187, 186; 271/51, 56, 57; 100/168

[56] References Cited

UNITED STATES PATENTS 2,613,706 10/1952 Smith ............................. 226/177 X
3,371,770 3/1968 Graham et al. .................... 226/186

*Primary Examiner*—Allen N. Knowles
*Attorney*—H. Christoffersen and Raymond E. Smiley

[57] ABSTRACT

A mechanism for automatically compensating for wear of a roller element which is to be properly positioned juxtaposed to a reference element, whereby the gap between the roller element and the reference element is maintained substantially constant.

7 Claims, 2 Drawing Figures

Patented July 17, 1973 3,746,231

AUTOMATIC WEAR COMPENSATING MECHANISM

BACKGROUND OF THE INVENTION

In magnetic tape stations, tape recorders, and the like, the tape often is passed between a drive capstan and a pinch roller. The purpose of the pinch roller is to maintain the tape in contact with the drive capstan, and it is desired that the pressure exerted on the tape (and hence the gap between capstan and pinch roller) be maintained constant without undue forces being exerted on the bearings.

In card handling apparatus, rotating members, rollers or drums, are used both for feeding cards and for separating the cards, i.e., for preventing the multiple feeding of cards. In this approach, the rollers or drums are separated initially by a gap through which only a single card may pass. Due to frictional forces between the cards and the rotating members, one or both of the latter may wear such that the gap increases to an extent that the cards are not fed properly. If the gap becomes too large, more than one card may pass through the gap at the same time. It then becomes necessary either to replace one or both of the rollers or drums, or to manually adjust their relative positions to provide the proper gap. Either procedure results in extensive down time of the equipment and costly maintenance.

SUMMARY OF THE INVENTION

Apparatus embodying the invention comprises a reference surface (which may be the surface of a drum or roller) and a rotating member which is biased toward the reference surface. Control means coacting with both the reference surface and the rotating member adjust the relative positions thereof to maintain the position of the rotating member's nearest surface constant relative to the reference surface.

BRIEF DESCRIPTION OF THE DRAWINGS

In the attached drawing, like components are designated by like reference numerals.

DETAILED DESCRIPTION OF THE DRAWINGS

Figure 1:
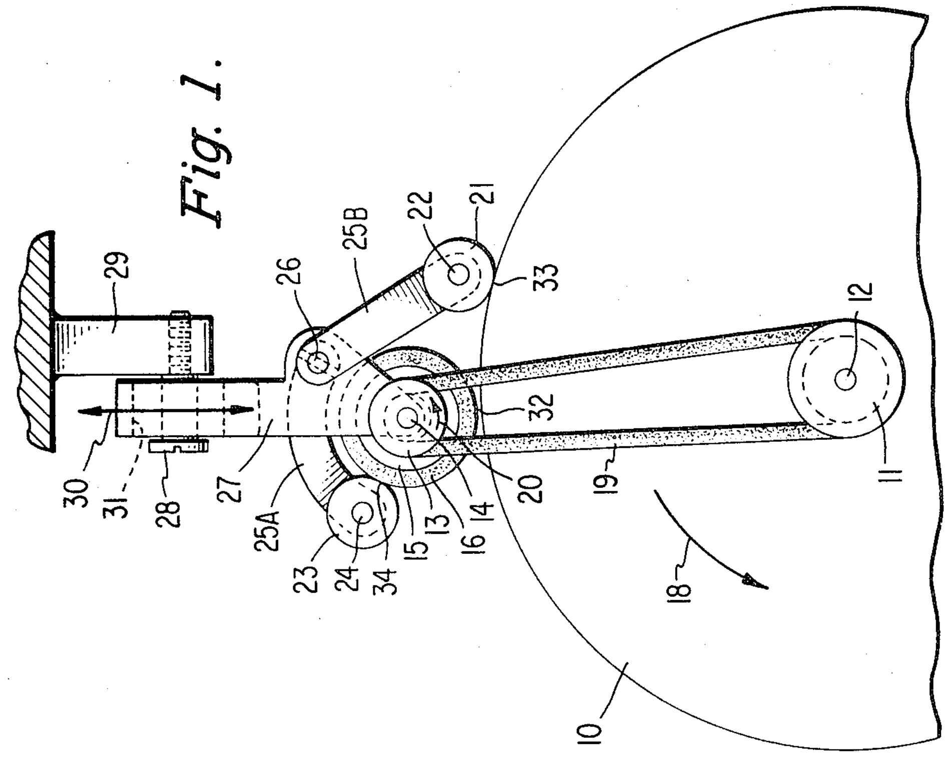
FIG. 1 is a front view of one embodiment of the instant invention.
Figure 2:
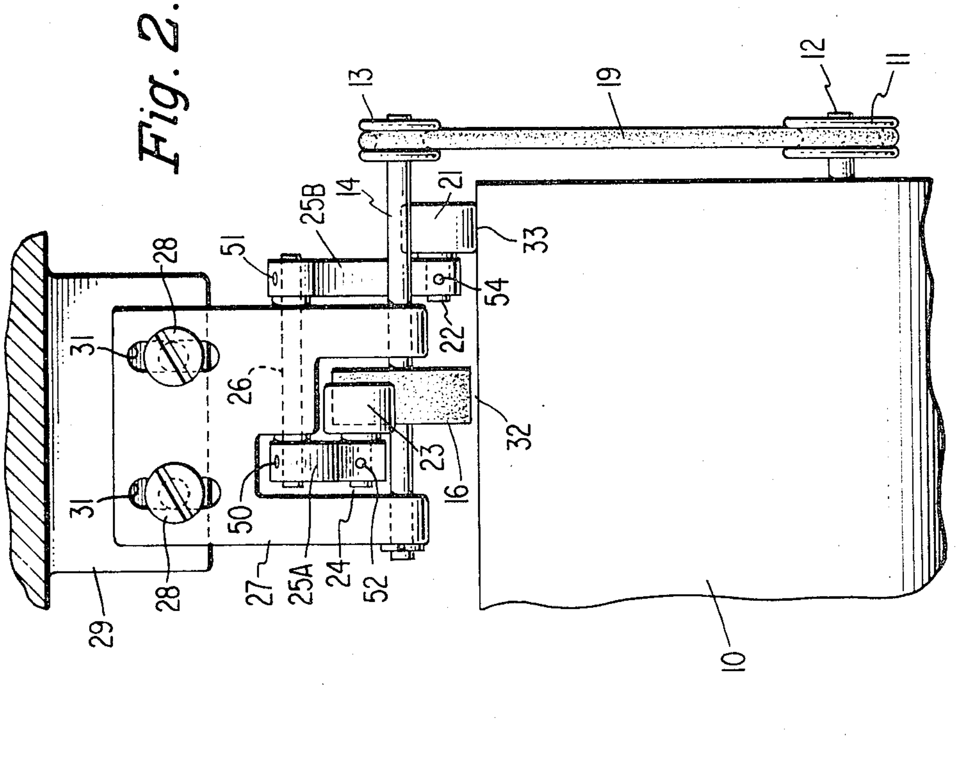
FIG. 2 is a left side view of the embodiment shown in FIG. 1.

In FIGS. 1 and 2, there is shown a first rotating member in the form of a drum 10 which is mounted on a shaft 12 and rotated in a counterclockwise direction, as indicated by arrow 18. The drive means (not shown) may be a motor by way of example. A first pulley 11 is fixedly mounted on shaft 12. Located above the drum 10 and spaced slightly therefrom is a second rotating member in the form of a roller 15 having a special outer surface 16. In this embodiment, a card handling apparatus is assumed, in which the drum 10 drives the cards and the roller 15, 16 prevents the feeding of undesired cards, specifically the multiple feeding of cards. In this case, the surface 16 of roller 15 may be a bonded Urethane material which provides improved frictional chracteristics to better restrain unwanted cards.

What is of importance for present purposes is that the distance between the near surfaces of the drum 10 and and roller 15, 16 be maintained substantially constant, especially as the surface 16 wears. The drum 10 surface may be considered the reference surface to which roller 15, 16 is referenced. Depending upon the application, the drum could be replaced by a roller or even a flat surface to which the roller 15, 16 is referenced.

Wear roller 15, 16 and a second pulley 13 are fixedly mounted on a rotatable shaft or axle 14. Pulley 13 is driven in a counterclockwise direction by a band or belt 19 from first pulley 11. This band 19 may be an O-ring and preferably is resilient to resiliently bias the roller 15, 16 toward the drum 10. Axle 14 is journaled or mounted with suitable bearings in a slidably mounted bracket 27. The specific shape of the bracket is not critical. As illustrated in FIG. 1, it may be substantially wedge shaped in front view. As shown in FIG. 2, the bracket 27 may be in the shape of an inverted U. The bracket 27 has a pair of elongated apertures 31 at the upper end thereof by means of which the bracket is slidably movable up and down, in the direction of arrow 30, on bolts 28 which extend through the apertures and into a fixed mounting base 29. Instead of this entire assembly being resiliently biased toward the drum 10 by the O-Ring 19, it could be separately biased toward the drum, e.g., by means of springs.

The control means for maintaining constant the gap 32 between the roller 15, 16 and the drum 10 comprises a wear sensing roller 23, an adjusting roller 21 and the mountings therefor. Wear roller 23 is rotatably mounted on an axle 24 or pin carried at the left end (FIG. 1) of an arm 25A, the right end of which is fixedly mounted on a pivot pin 26 rotatably carried by the bracket 27. The adjusting roller 21 is rotatably mounted on a pin 22 carried at the right end (FIG. 1) of a second arm 25B. The other end of this arm is fixedly mounted on the pivot pin 26. Because both arms 25A, 25B are fixedly mounted or secured on the pivot pin, they are constrained to rotate together. In fact, a single or one piece control arm could replace the two arms 25A, 25B where space permits. Set screws 50 and 51 (FIG. 2) secure the arms 25A, 25B, respectively, to the pivot pin or shaft 26. In like manner, set screws 52 and 54 may be used to secure the pins 24 and 22 to the arms 25A and 25B, respectively.

In the operation of the system, cards or other documents are fed from the right (as viewed in FIG. 1) into the gap 32 between the wear roller 15, 16 and the drum 10. They then are driven through the gap by the drum 10. In order to prevent the passage of two cards at one time, the gap 32 is maintained relatively constant at a dimension which is slightly greater than the thickness of one card, but less than the combined thicknesses of two cards. Then, when two cards attempt to pass through the gap at the same time, the top card will be engaged by the wear roller 15, 16 and swept to the right (as viewed in FIG. 1). Because the wear roller 15, 16 rotates in a direction which is opposite to the direction of card travel, the surface of this roller tends to wear. As the surface 16 of roller 15 wears, the gap 32 would tend to become larger in the absence of some compensating means. Eventually, the gap would become large enough to allow the passage of more than one card. The sensing and adjusting mechanism described supra prevents this condition by monitoring wear of the roller's surface and adjusting the position of the entire upper assembly, and hence the roller, to maintain the gap 32 substantially constant.

The entire upper assembly is constantly biased in a downward direction toward the drum by the resilient O-ring 19. This produces a force on the adjusting roller 21, at its point 33 of contact with the drum, which tends to rotate arm 25B and, hence arm 25A, about the pivot 26. However, no rotation can take place when the sensing roller 23 is in contact with the surface 16 of wear roller 15. This condition fixes the vertical position of the upper assembly, and thus the size of gap 32, since the adjusting roller is in contact with the drum, and the arms 25A, 25B cannot rotate.

There is always pressure on the adjusting roller 21 as a result of the bias. As the surface 16 of roller 15 wears, this force causes the arms 25A, 25B to rotate slightly in the counterclockwise direction to maintain the sensing roller 23 in contact with the surface 16 of the wear roller 15. As the arms rotate, the bias exerted by the O-ring forces the entire upper assembly to move in a downward direction to maintain the adjusting roller 21 in contact with the drum. Ideally, the amount of movement is just sufficient to compensate for roller 15, 16 wear and, thus, to maintain the gap size constant. The ideal is reached, or at least closely approached, when the distances between the pivot pin 26 and each of the adjusting roller 21 and wear sensing roller 23 are equal. In that event, any change in the position of the wear roller results in an equal change in position of the adjusting roller.

What is claimed is:

1. The combination comprising:
- a reference surface;
- a rotatable member having a surface;
- means biasing said rotatable member toward said reference surface;
- control means comprising a rotatable mechanism having mounted thereon an adjusting element in contact with said reference surface, and a sensing element in contact with said rotatable member for maintaining the two surfaces spaced apart a substantially fixed distance.

2. The combination as claimed in claim 1, wherein said rotatable mechanism is rotatable about a point which is substantially equidistant from said adjusting element and said sensing element, and wherein the distance between said point and the axis of said rotatable member is constant.

3. The combination comprising:
- a first rotatable member;
- a second rotatable member;
- a mounting member on which said second member is mounted for rotation;
- means biasing one of said first member and said mounting member toward the other; and
- control means mounted on said mounting member and having sensing means in contact with said second member to control the spacing between said first member and said second member.

4. The combination as claimed in claim 3, wherein said control means includes first and second arms pivotally pinned to said mounting means and constrained to rotate together, said sensing means being mounted on one of said arms, and adjusting means mounted on the other of said arms and in contact with said first rotatable member.

5. The combination claimed in claim 4, wherein said sensing means and said adjusting means each comprises a roller element.

6. The combination as claimed in claim 5 wherein each said roller element is located approximately the same distance from the point where said first and second arms are pivotally pinned to said mounting means.

7. The combination as claimed in claim 4 wherein said mounting means is slidably movable toward and away from said first rotatable member.

* * * * *

Disclaimer 3,746,231.—*Eddy Humberto Del Rio*, Palm Beach Gardens, Fla. AUTOMATIC WEAR COMPENSATING MECHANISM. Patent dated July 17, 1973. Disclaimer filed Apr. 10, 1975, by the assignee, *RCA Corporation.*

Hereby enters this disclaimer to claims 1 through 7, inclusive of said patent.

[*Official Gazette February 10, 1976.*]